(12) United States Patent
Lee

(10) Patent No.: US 7,043,918 B1
(45) Date of Patent: May 16, 2006

(54) ENVIRONMENT-FRIENDLY ENGINE SYSTEM

(76) Inventor: Shu Lee, 235 Chung-Ho Box 8-24, Taipei (TW)

( * ) Notice: Subject to any disclaimer, the term of this patent is extended or adjusted under 35 U.S.C. 154(b) by 0 days.

(21) Appl. No.: 11/093,251

(22) Filed: Mar. 29, 2005

(51) Int. Cl.
*F01K 25/06* (2006.01)

(52) U.S. Cl. .......................................... 60/649; 60/670
(58) Field of Classification Search ................ 60/645, 60/649, 670
See application file for complete search history.

(56) References Cited

U.S. PATENT DOCUMENTS 3,682,142 A * 8/1972 Newkirk ...................... 123/3
4,161,657 A * 7/1979 Shaffer, Jr. ................. 290/1 R
6,155,212 A * 12/2000 McAlister ..................... 123/3
6,817,182 B1 * 11/2004 Clawson ...................... 60/670

* cited by examiner

*Primary Examiner*—Hoang Nguyen

(57) ABSTRACT

An environment-friendly engine system is characterized by that hydrogen gas that fuels the engine is generated from water by electrolysis and that the electric power for electrolysis is supplied by a fuel cell in a water fuel tank and a leadacid cell connected in parallel with the fuel cell. As the engine system is operating, the fuel cell burns methyl alcohol or ethyl alcohol to generate power for activating water electrolysis that produces hydrogen gas. The hydrogen gas fuels a hydrogen engine, and the steam produced in the engine is used to drive an electricity generator and subsequently a turbine, whereby the electricity is stored in a leadacid cell used together with the fuel cell. Thereby, the engine system is safe to operate and produces no any of the greenhouse gases, truly friendly to the environment.

11 Claims, 1 Drawing Sheet

ENVIRONMENT-FRIENDLY ENGINE SYSTEM

FIELD OF THE INVENTION

The present invention relates to environment-friendly engines, more particularly to an environment-friendly engine system having a hydrogen engine fueled by hydrogen gas generated from water by electrolysis.

BACKGROUND OF THE INVENTION

Engines fueled by gasoline are commonly used for providing power for electricity generators or automobiles. However, engines of this type will produce a variety of pollutants during combustion, which are unfriendly to the environment.

On the other hand, hydrogen gas, having no carbon, can also be used to fuel engines, while not producing pollutants such as hydrocarbons (HC), carbon monoxide (CO) and carbon dioxide (CO2). Therefore, hydrogen gas is an ideal engine fuel.

Because of its properties of combustion, especially its low flammability, engines using hydrogen fuel must be operated under special air to fuel ratios. This problem has been overcome and disclosed by many patents. Therefore, many automobile manufacturers, such as BMW and Toyota, have substantiated the utilization of hydrogen engines in their products.

The hydrogen engines of the prior art commonly adopt a storage tank filled with pressurized or liquid hydrogen gas. After mixing with air, the fuel is injected into a combustion chamber to drive the cylinders. When the fuel in the tank is used up, it must be refilled. Therefore, the promotion of cars using the hydrogen engines depends critically on the availability of a hydrogen filling bay at a common gas station, which is up to date not usual. Further, the addition of a hydrogen filling bay brings extra risk to a gas station.

SUMMARY OF THE INVENTION

Accordingly, the primary objective of the present invention is to provide a practicable environment-friendly engine system wherein the hydrogen gas fueling the engine is generated from water by electrolysis. Therefore, only a water fuel tank has to be refilled with water. Further, the engine system is similar to the engines of the prior art in structure, and therefore it can be installed in conventional car bodies easily.

To achieve above object, the present invention provides a An environment-friendly engine system is characterized by that hydrogen gas that fuels the engine is generated from water by electrolysis and that the electric power for electrolysis is supplied by a fuel cell in a water fuel tank and a leadacid cell connected in parallel with the fuel cell. As the engine system is operating, the fuel cell burns methyl alcohol or ethyl alcohol to generate power for activating water electrolysis that produces hydrogen gas. The hydrogen gas fuels a hydrogen engine, and the steam produced in the engine is used to drive an electricity generator and subsequently a turbine, whereby the electricity is stored in a leadacid cell used together with the fuel cell. Thereby, the engine system is safe to operate and produces no any of the greenhouse gases, truly friendly to the environment.

To attain the above objective, the hydrogen gas is produced by electrolysis power by a fuel cell and a leadacid cell. Therefore, there will be little hydrogen gas released, should a car accident happens. For, example, when an automobile equipped with the present invention runs into an accident, the present invention will shut down power automatically so as to terminate the hydrogen production in the hydrogen generator. Therefore, only water will be leaked in an accident, removing the possibility of an explosion. Further, since the fuel cell of the present invention is enclosed in the water fuel tank, the methyl alcohol or ethyl alcohol therein will be diluted by the surrounding water once the water fuel tank is broken.

The secondary objective of the present invention is to provide an environment-friendly engine system wherein the fuel is hydrogen gas, and wherein the water produced in combustion is used to drive an electricity generator and subsequently a turbine.

To attain the secondary objective, water steam produced by combustion is directly used to drive an electricity generator, which will not lose engine power as the situation in a conventional car engine wherein a belt is connected between the engine and the generator. It is a another advantage of the present invention that the steam is effectively pre-cooled by its driving the generator, and therefore complicated steam cooling system is not necessary.

Another objective of the present invention is to provide an environment-friendly engine system wherein the waste water produced by the fuel cell can be recycled and collected by a water fuel tank, whereas conventional fuel cells cannot recycle its waste water. Further, the steam generated in combustion will be collected by a cooling exhausting system and injected back to the water fuel tank. Therefore, the engine system produces no any of the greenhouse gases, truly friendly to the environment.

It is a further objective of the present invention that the only fuel is water. Therefore, an environment-friendly engine system according to the present invention only need a water supply rather than hydrogen gas, therefore solving the security and convenience problems associated an external hydrogen supply. Further, there could be a backup water fuel tank mounted in the car, similar to the additional fuel tanks in an airplane. A benefit of this backup water fuel tank is that it can be used to balance the load of the car and to play the role of a cushioning thing, making the car safer.

The various objects and advantages of the present invention will be more readily understood from the following detailed description when read in conjunction with the appended drawings.

DETAILED DESCRIPTION OF THE PREFERRED EMBODIMENTS

Figure 1:
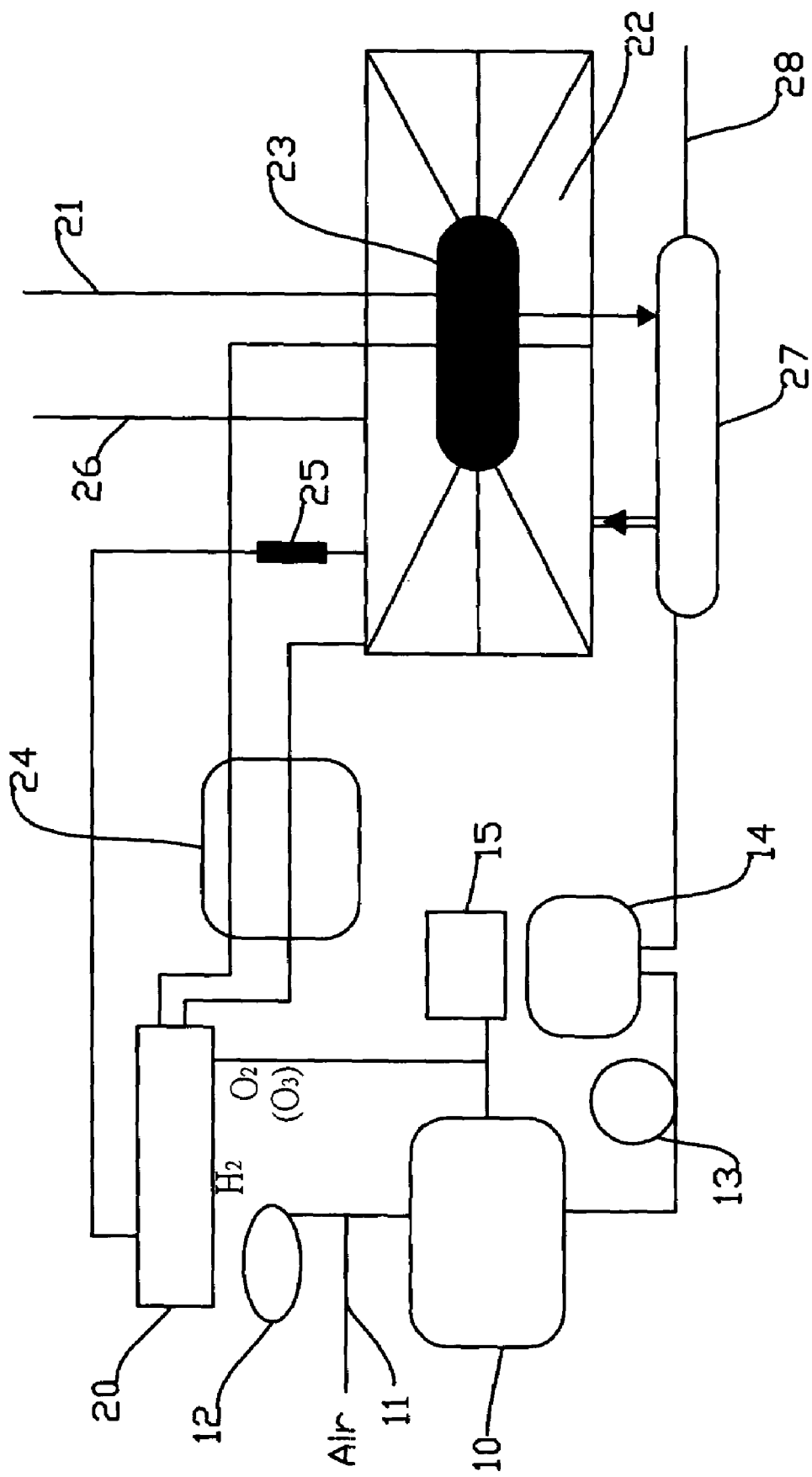
FIG. 1 is the system chart of an environment-friendly engine system according to the present invention.

Referring to FIG. 1, an environment-friendly engine system according to the present invention comprises a hydrogen engine 10, an air pipe 11, a hydrogen storage bottle 12, an electricity generator 13 and a turbine 14. The hydrogen gas from the hydrogen storage bottle 12 is firstly mixed with the air from the air pipe 11 and then injected into the hydrogen engine 10 for combustion and generating power. At the same time, the steam generated from the combustion is reused to drive an electricity generator 13 which then drives a turbine 14.

The environment-friendly engine system further comprises a hydrogen generator 20, which is basically a water electrolyzing tank. The electricity supplied to the hydrogen generator 20 is used to dissolve the water therein into hydrogen gas and oxygen gas. The hydrogen gas is injected the hydrogen storage bottle 12, and the oxygen and ozone produced in the electrolysis are guided into an air filtering system 15; the oxygen can also be injected into the hydrogen engine 10 with an appropriate amount to attend the combustion, thereby reducing the consumption of air. The oxygen and ozone can also be guided into the passenger space of the car, enhancing the comfort of the passengers.

The electricity consumed by the hydrogen generator 20 is supplied by a fuel cell 23 and a leadacid cell 24 situating in a water fuel tank 22; the fuel cell 23 and the leadacid cell 24 are connected in parallel. The fuel cell 23 is fueled by methyl alcohol and ethyl alcohol, which fuel is injected through an exhaust pipe 21. The leadacid cell 24 is charged by the electricity generator 13.

The water in the water fuel tank 22 is injected through a water filter 25 and is for the electrolysis in the hydrogen generator 20, whereby hydrogen gas is generated. The water fuel tank 22 is provided with a water inlet 26 for filling water when the water in the water fuel tank 22 is not sufficient. The water fuel tank 22 can also receive the water recycled in a cooling exhausting system 27.

The cooling exhausting system 27 is for collecting the water and the exhaust gas produced from the hydrogen engine 10 and the fuel cell 23. The water is recycled and collected in the water fuel tank 22, whereas the exhaust gas (including steam) will be ejected through an exhaust pipe 28.

To use the environment-friendly engine system, the fuel cell 23 is ignited to generate electricity, which electricity powers the water electrolysis within the hydrogen generator 20. The hydrogen gas produced in the electrolysis is collected by the hydrogen storage bottle 12. The hydrogen gas is then mixed with air and injected into the hydrogen engine 10 for combustion.

As the hydrogen engine 10 is operating, the water steam produced in the hydrogen combustion is used by the electricity generator 13 for generating electricity, which electricity is stored by the leadacid cell 24 and then powers the water electrolysis in the hydrogen generator 20. The used steam from the electricity generator 13 is guided to the turbine 14 and then the cooling exhausting system 27. Since the steam is pre-cooled before the electricity generator 13, the cooling exhausting system 27 is simple and easy to maintain.

The water and waste gas produced in the hydrogen engine 10 and the fuel cell 23 will be guided into the cooling exhausting system 27, wherein the water is collected by the water fuel tank 22 and the waste gas is rejected through the exhaust pipe 28 to the outside.

As the water fuel tank 22 is short of water, new water is added through a water inlet 26 thereof. According to the above description, the environment-friendly engine system only need a water supply rather than hydrogen gas, therefore solving the security and convenience problems associated an external hydrogen supply.

Since the fuel cell 23 of the present invention is located in the water fuel tank 22, it will not explode in an accident.

When an automobile equipped with the present invention runs into an accident, the present invention will shut down power automatically so as to terminate the hydrogen production in the hydrogen generator 20. Therefore, only water will be leaked in an accident, removing the possibility of an explosion. Further, since the fuel cell 23 of the present invention is enclosed in the water fuel tank 22, the methyl alcohol or ethyl alcohol therein will be diluted by the surrounding water once the water fuel tank 22 is broken. To assure the function of this safety measure, the structure connecting the fuel cell 23 with surrounding the water fuel tank 22 is so designed that the fuel cell 23 will break as soon as the water fuel tank 22 breaks. Moreover, the hydrogen storage bottle 12 is provided with a piston, whereby the piston will block the gas outlet of the hydrogen storage bottle 12 if the signal terminal 2 was flipped in an accident that the car is turned over. This mechanism is realized by an angle detecting device and an actuating mechanism mounted with the piston.

When the present invention is used in a car, there could be a backup water fuel tank, similar to the additional fuel tanks in an airplane. A benefit of this backup water fuel tank is that it can be used to balance the load of the car and to play the role of a cushioning thing, making the car safer.

Most importantly, the present invention under normal operation uses only hydrogen gas as the fuel, and the water produced in the combustion is recycled (collected by the water fuel tank). Further, the waste water produced by the fuel cell can also be recycled. Therefore, the engine system produces no any of the greenhouse gases, truly friendly to the environment.

Moreover, the hydrogen engine 10 of the present invention can be replaced by a gas engine. In this preferred embodiment, the steam produced by the gas engine is likewise used to drive the electricity generator 13 and the subsequent turbine 14, therefore being environment-friendly too. The hydrogen storage bottle will be replaced by a natural gas bottle.

The present invention is thus described, and it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An environment-friendly engine system, comprising:
   a hydrogen engine fueled by a mixture of hydrogen gas and air, said hydrogen gas being supplied by a hydrogen storage bottle, said mixture being ignited to burn so as produce mechanical power, steam produced in combustion being used to drive at least an electricity generator and a subsequent turbine;
   a hydrogen generator powered by batteries for activating an electrolysis of water whereby said hydrogen gas is generated, said hydrogen gas being transported to said hydrogen storage bottle; and
   a cooling exhausting system for cooling down and ejecting water and waste gases produced by said hydrogen engine and said batteries.

2. The environment-friendly engine system of claim 1 further comprising an air filtering system for treating oxygen gas and ozone gas produced by said electrolysis of water and injecting said oxygen gas into said hydrogen engine with an appropriate amount, thereby reducing the consumption of air; said oxygen gas and said ozone gas being added through said air filtering system into a passenger space of an automobile for improving air quality.

3. The environment-friendly engine system of claim 1 wherein said batteries of said hydrogen generator comprises at least a fuel cell and a leadacid cell.

4. The environment-friendly engine system of claim 2 wherein water used by said hydrogen generator is supplied by a water fuel tank.

5. The environment-friendly engine system of claim 3 wherein said fuel cell situates within said water fuel tank.

6. The environment-friendly engine system of claim 2 wherein said leadacid cell is for storing the electricity generated by said electricity generator.

7. The environment-friendly engine system of claim 3 wherein a water filter is mounted between said water fuel tank and said hydrogen generator.

8. The environment-friendly engine system of claim 2 wherein methyl alcohol and ethyl alcohol can be added into said fuel cell through a common pipeline for fuel addition and exhausting waste gases; waste water produced by said fuel cell being collected in said water fuel cell for reuse.

9. The environment-friendly engine system of claim 1 can be used in an automobile and used with a gasoline-based engine system.

10. The environment-friendly engine system of claim 8 further comprising a backup water fuel tank; said backup water fuel tank it being capable of balancing the load of a car and being used as a cushioning thing in a car accident.

11. The environment-friendly engine system of claim 1 wherein said hydrogen storage bottle is further provided with a piston, whereby said piston will block a gas outlet of said hydrogen storage bottle if said hydrogen storage bottle was flipped as a result of a turnover of said car.

* * * * *